United States Patent
Hartman et al.

(10) Patent No.: US 12,280,880 B2
(45) Date of Patent: Apr. 22, 2025

(54) EVACUATION SYSTEM INFLATABLE TOE END SPRING AND SILL HEIGHT COMPENSATING FEATURE

(71) Applicant: GOODRICH CORPORATION, Charlotte, NC (US)

(72) Inventors: Drew Hartman, Phoenix, AZ (US); Jaro S. Volny, Scottsdale, AZ (US); Karl L Winkelman, Chandler, AZ (US); Scott A Luobikis, Phoenix, AZ (US); Breanna Swift Holmes, Scottsdale, AZ (US); Baltazar Gonzalez Leon, Phoenix, AZ (US); Ryan Foley, Phoenix, AZ (US); Ivan Kruts, Sacramento, CA (US); Raoul Evrard Chinang, Phoenix, AZ (US); Tony Pope, Tempe, AZ (US); Timothy C Haynes, Prescott Valley, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 993 days.

(21) Appl. No.: 17/034,617

(22) Filed: Sep. 28, 2020

(65) Prior Publication Data
US 2021/0009277 A1    Jan. 14, 2021

Related U.S. Application Data

(62) Division of application No. 15/934,345, filed on Mar. 23, 2018, now Pat. No. 10,822,098.

(51) Int. Cl.
*B64D 25/14* (2006.01)
(52) U.S. Cl.
CPC .................................. *B64D 25/14* (2013.01)

(58) Field of Classification Search
CPC ...... A62B 1/20; B64D 25/14; B63B 2027/145
See application file for complete search history.

(56) References Cited

U.S. PATENT DOCUMENTS 3,370,684 A * 2/1968 Holcombe ............... A62B 1/20
                                                  193/25 B
3,473,641 A * 10/1969 Fisher .................... B64D 25/14
                                                  193/25 B (Continued)

FOREIGN PATENT DOCUMENTS

| CA | 2369188 | 7/2003 |
| DE | 19949484 | 12/2000 |

OTHER PUBLICATIONS

USPTO, Pre Interview First Office Action dated Jul. 3, 2019 in U.S. Appl. No. 15/934,345.

(Continued)

*Primary Examiner* — Gregory J Strimbu
(74) *Attorney, Agent, or Firm* — SNELL & WILMER L.L.P.

(57) ABSTRACT

An evacuation slide may comprise a first sill height compensating feature coupled to an upper main support tube and a second sill height compensating feature coupled to the upper main support tube, wherein the first sill height compensating feature and the second sill height compensating feature extend longitudinally past the sliding surface of the evacuation slide in response to the evacuation slide being deployed. The first sill height compensating feature and the second sill height compensating feature may be configured to increase a vertical distance between the upper main support tube and an exit surface.

6 Claims, 9 Drawing Sheets

(56) References Cited

U.S. PATENT DOCUMENTS

| | | | |
|---|---|---|---|
| 3,554,344 A | | 1/1971 | Summer et al. |
| 3,712,417 A | | 1/1973 | Chacko et al. |
| 4,333,546 A | * | 6/1982 | Fisher .................... B64D 25/14 |
| | | | 193/25 B |
| 4,519,782 A | * | 5/1985 | Fisher ............... H01L 21/28512 |
| | | | 257/E21.162 |
| 5,820,773 A | * | 10/1998 | Hintzman .............. B64D 25/14 |
| | | | 193/25 B |
| 5,875,868 A | * | 3/1999 | Smialowicz ............. A62B 1/20 |
| | | | 193/25 B |
| 6,454,220 B1 | | 9/2002 | Oney |
| 6,799,741 B2 | | 10/2004 | Danielson et al. |
| 2003/0080254 A1 | | 5/2003 | Alberts |
| 2010/0258677 A1 | * | 10/2010 | O'Donnell ............. B64D 25/14 |
| | | | 244/137.2 |
| 2017/0088274 A1 | | 3/2017 | Hartman et al. |
| 2019/0217962 A1 | * | 7/2019 | Kruts .................... B64D 25/14 |
| 2019/0291881 A1 | * | 9/2019 | Hartman ................ B64D 25/14 |
| 2021/0009276 A1 | * | 1/2021 | Haynes ................. B64D 25/14 |
| 2021/0122481 A1 | * | 4/2021 | Biro ....................... B64D 25/14 |

OTHER PUBLICATIONS

USPTO, First Action Interview Office Action dated Oct. 22, 2019 in U.S. Appl. No. 15/934,345.

USPTO, Final Office Action dated Mar. 9, 2020 in U.S. Appl. No. 15/934,345.

USPTO, Advisory Action dated May 19, 2020 in U.S. Appl. No. 15/934,345.

USPTO, Notice of Allowance dated Jun. 29, 2020 in U.S. Appl. No. 15/934,345.

\* cited by examiner

EVACUATION SYSTEM INFLATABLE TOE END SPRING AND SILL HEIGHT COMPENSATING FEATURE

CROSS REFERENCE TO RELATED APPLICATIONS

This application is a divisional of, and claims priority to, and the benefit of U.S. patent application Ser. No. 15/934,345, filed on Mar. 23, 2018, and entitled "EVACUATION SYSTEM INFLATABLE TOE END SPRING AND SILL HEIGHT COMPENSATING FEATURE" which is incorporated by reference herein in its entirety.

FIELD

The present disclosure relates to inflatable evacuation slides and, in particular, to inflatable evacuation slides having sill height compensating features.

BACKGROUND

Emergency evacuation slides may be used to exit an aircraft absent a jet way or other suitable means of egress for passengers. The slides may deploy from a door sill or a side of the aircraft fuselage, for example. Aircraft sill heights can change during an emergency landing if some or all of the landing gear fails. It may be desirable for an evacuation slide to perform in all these conditions with a suitable sliding angle, i.e., short enough to meet high evacuation rates at normal sill, while also being long enough to support a high sill condition.

SUMMARY

An evacuation slide is disclosed, comprising an upper main support tube extending longitudinally along the first side and extending longitudinally along the second side, a lower main support tube extending longitudinally along the first side and extending longitudinally along the second side, a flexible panel defining a sliding surface extending longitudinally between a toe end and a head end of the evacuation slide and extending crosswise between a first side and a second side of the evacuation slide, wherein the flexible panel is supported between the upper main support tube and the lower main support tube, a first sill height compensating feature coupled to the upper main support tube, and a second sill height compensating feature coupled to the upper main support tube, wherein the first sill height compensating feature and the second sill height compensating feature extend longitudinally past the sliding surface of the evacuation slide in response to the evacuation slide being deployed.

In various embodiments, the first sill height compensating feature and the second sill height compensating feature are configured to increase a vertical distance between the upper main support tube and an exit surface in response to a sill height of the evacuation slide increasing.

In various embodiments, the sliding surface is disposed between the first sill height compensating feature and the second sill height compensating feature.

In various embodiments, the first sill height compensating feature and the second sill height compensating feature provide support to the toe end of the evacuation slide in response to the evacuation slide contacting the exit surface.

In various embodiments, the first sill height compensating feature, the second sill height compensating feature, and the toe end contact the exit surface in response to the evacuation slide being loaded at a first sill height.

In various embodiments, the first sill height compensating feature and the second sill height compensating feature contact the exit surface and the toe end is suspended in response to the evacuation slide being loaded at a second sill height.

In various embodiments, the second sill height is greater than the first sill height.

In various embodiments, a chamber defined by the first sill height compensating feature is in fluid communication with an upper chamber defined by the upper main support tube.

In various embodiments, the chamber is in fluid communication with the upper chamber via an aperture configured to meter a flow of air entering the first sill height compensating feature.

In various embodiments, the first sill height compensating feature is inflatable and the second sill height compensating feature is inflatable.

In various embodiments, at least one of the first sill height compensating feature and the second sill height compensating feature comprises a cylindrical geometry, an ellipsoidal geometry, or a rectangular geometry.

A system is disclosed, comprising a sill height compensating feature for an evacuation slide is disclosed, configured to be coupled to a main support tube of the evacuation slide, wherein the sill height compensating feature is configured to extend longitudinally past a sliding surface of the evacuation slide, wherein the sill height compensating feature is configured to increase a first vertical distance between the main support tube and an exit surface in response to a sill height of the evacuation slide increasing.

In various embodiments, the sill height compensating feature is inflatable.

In various embodiments, the sill height compensating feature is inflated in response to the evacuation slide being inflated.

In various embodiments, the sill height compensating feature is in fluid communication with the evacuation slide via an aperture configured to meter a flow of air between the main support tube of the evacuation slide and the sill height compensating feature.

In various embodiments, the sill height is a second vertical distance between a head end of the evacuation slide and the exit surface.

A method for manufacturing an evacuation slide is disclosed, comprising disposing an upper main support tube to extend longitudinally along the first side and to extend longitudinally along the second side, disposing a lower main support tube to extend longitudinally along the first side and to extend longitudinally along the second side, disposing a flexible panel defining a sliding surface to extend longitudinally between a toe end and a head end of the evacuation slide and to extend crosswise between a first side and a second side of the evacuation slide, wherein the flexible panel is supported between the upper main support tube and the lower main support tube, coupling a first sill height compensating feature to the upper main support tube, and coupling a second sill height compensating feature to the upper main support tube, wherein the first sill height compensating feature and the second sill height compensating feature extend longitudinally past the sliding surface of the evacuation slide in response to the evacuation slide being deployed.

In various embodiments, the sliding surface is disposed between the first sill height compensating feature and the second sill height compensating feature.

In various embodiments, the coupling includes at least one of sewing and bonding.

In various embodiments, the method further comprises disposing an aperture between a chamber defined by the first sill height compensating feature and an upper chamber defined by the upper main support tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Emergency evacuation slides may be used to exit an aircraft absent a jet way or other suitable means of egress for passengers. The slides may deploy from a door sill or a side of the aircraft fuselage, for example. Aircraft sill heights can change during an emergency landing if some or all the landing gear fails. It may be desirable for an evacuation slide to perform in all these conditions with a suitable sliding angle (short enough to meet high evacuation rates at normal sill, while also being long enough to support a high sill condition).

Slides according to the present disclosure may extend from an aircraft structure, such as a fuselage or a wing, for example, to an exit surface. Two sill height compensating features may be provided for decreasing the sliding angle of the slide at a high sill condition, while minimally impacting the sliding angle at normal sill condition.

Figure 1A:
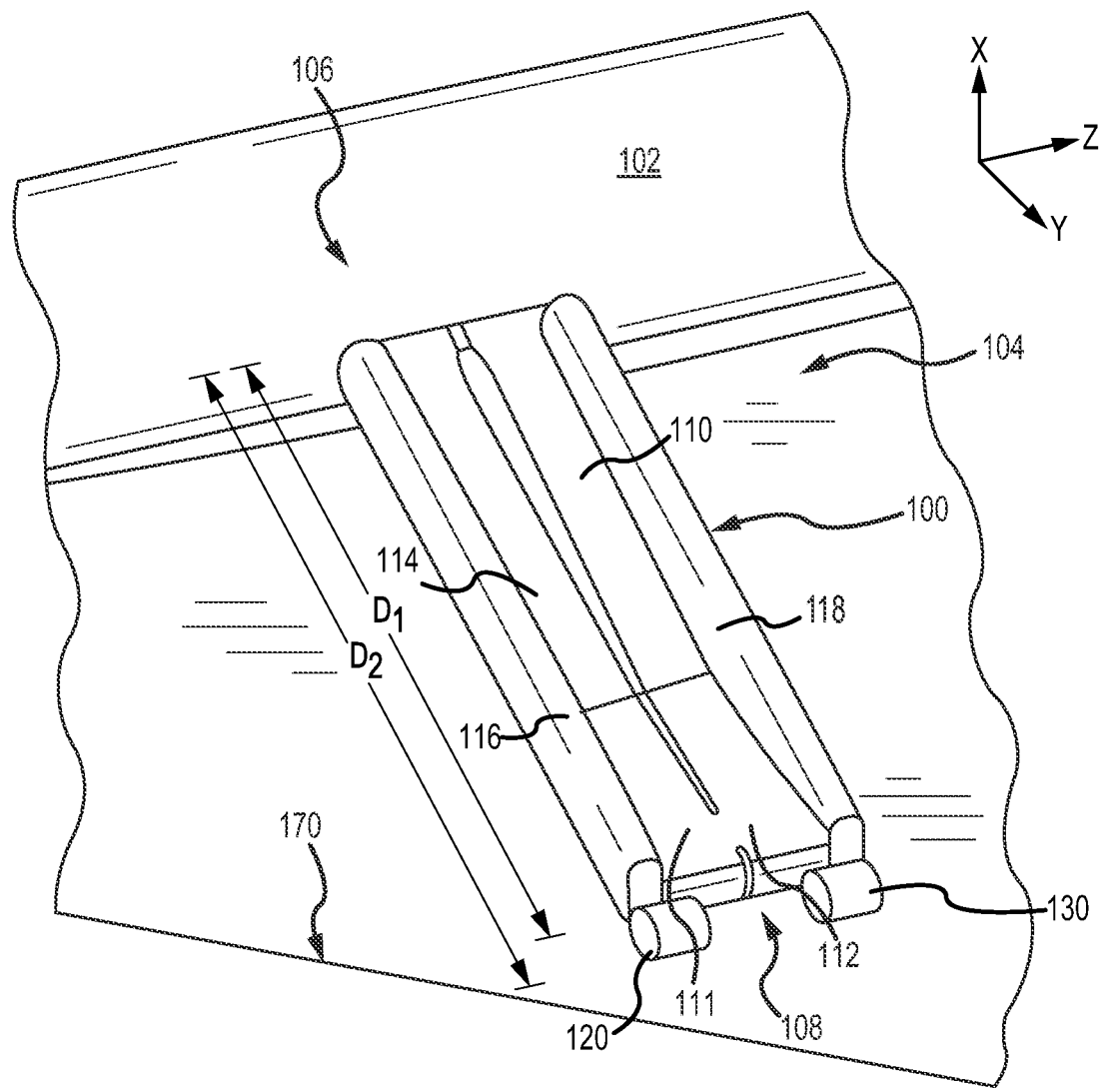
FIG. 1A illustrates a perspective view of an evacuation slide in a deployed position, in accordance with various embodiments.
Figure 1B:
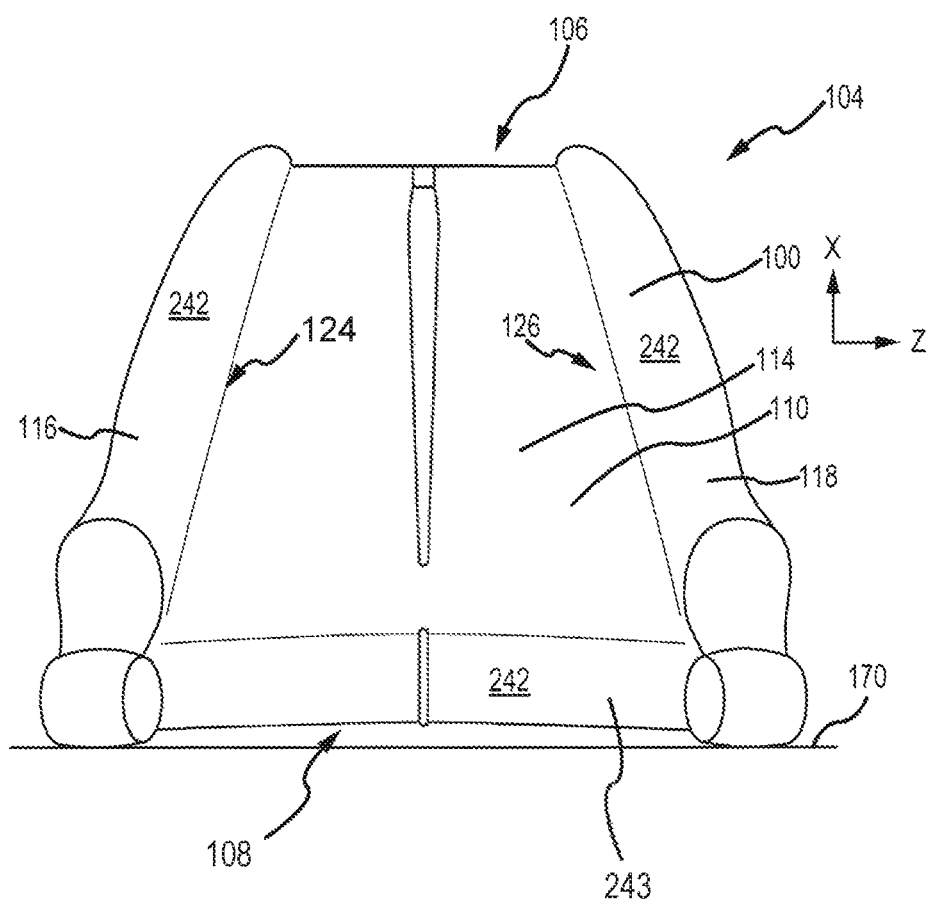
FIG. 1B illustrates a front view of an inflated evacuation slide, in accordance with various embodiments.

With combined reference to FIG. 1A and FIG. 1B, an evacuation system 104 is illustrated, in accordance with various embodiments. XYZ axes are provided for ease of illustration. Evacuation system 104 may comprise evacuation slide 100 coupled to an aircraft structure 102. Evacuation slide 100 may comprise a head end 106 and a toe end 108. Head end 106 may be coupled to aircraft structure 102. In various embodiments, aircraft structure 102 may comprise a fuselage, a fairing, a wing, or any other portion of an aircraft. FIG. 1A and FIG. 1B illustrate evacuation slide 100 in a deployed position. Evacuation slide 100 may comprise an inflatable slide. FIG. 1A and FIG. 1B illustrate evacuation slide 100 in an inflated position. Evacuation slide 100 may comprise a dual lane slide comprising a first lane 111 and a second lane 112. However, evacuation slide 100 may comprise any number of lanes, such as a single lane slide for example. Toe end 108 may contact an exit surface 170 in response to evacuation slide 100 being deployed. In various embodiments, evacuation slide 100 may be inflated in response to opening an emergency exit door. Evacuation slide 100 may comprise a flexible panel 110 defining a sliding surface 114. Sliding surface 114 may comprise a dimension $D_1$. Dimension $D_1$ may comprise the length of sliding surface 114. Dimension $D_1$ may comprise the length of the sloped portion of evacuation slide 100, in response to evacuation slide 100 being in the deployed or inflated position, as illustrated in FIG. 1A.

In various embodiments, sliding surface 114 may extend longitudinally between toe end 108 and head end 106. Sliding surface 114 may extend crosswise between a first side 116 and a second side 118 of evacuation slide 100.

Evacuation slide 100 may comprise a first sill height compensating feature 120 and a second sill height compensating feature 130. First sill height compensating feature 120 may be coupled to toe end 108. Second sill height compensating feature 130 may be coupled to toe end 108. In various embodiments, first sill height compensating feature 120 and a second sill height compensating feature 130 may be configured to inflate with evacuation slide 100. Sill height compensating feature may comprise a fabric inflatable envelope. The fabric inflatable envelope may have a variety of geometries such as cylinders, including ellipsoidal and circular, or prisms, among others.

Evacuation slide 100 may comprise a dimension $D_2$. Dimension $D_2$ may comprise the length of evacuation slide 100, including first sill height compensating feature 120 and second sill height compensating feature 130. Dimension $D_2$ may comprise the length of evacuation slide 100 from head end 106 to the terminus of first sill height compensating feature 120 and/or second sill height compensating feature 130, in response to evacuation slide 100 being in the deployed or inflated position, as illustrated in FIG. 1A and FIG. 1B. Dimension $D_2$ may be greater than Dimension $D_1$. In this regard, first sill height compensating feature 120 and second sill height compensating feature 130 may extend longitudinally past toe end 108.

In various embodiments, first sill height compensating feature 120 may be offset, in the crosswise direction (i.e., the Z-direction), from sliding surface 114. Second sill height compensating feature 130 may be offset, in the crosswise direction (i.e., the Z-direction), from sliding surface 114. In this regard, first sill height compensating feature 120 and a second sill height compensating feature 130 may be offset from sliding surface 114 so as to not obstruct a person from exiting evacuation slide 100.

Figure 2A:
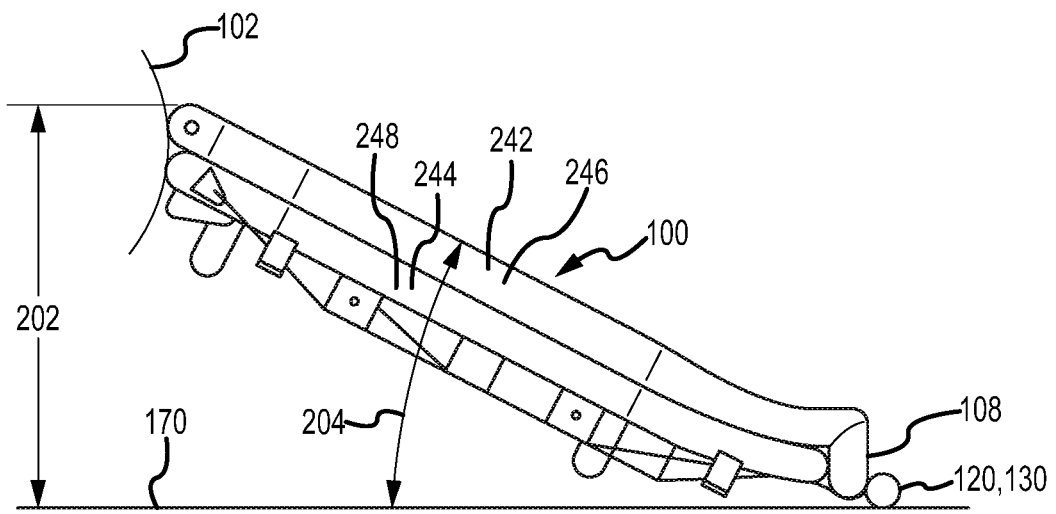
FIG. 2A illustrates a side view of an inflated evacuation slide at a normal sill height and without a load, in accordance with various embodiments.

With combined reference to FIG. 1B and FIG. 2A, evacuation slide 100 may comprise a first chamber (also referred to herein as an upper chamber) 242 defined by an upper main support tube 246 and a second chamber (also referred to herein as a lower chamber) 244 defined by a lower main support tube 248. Upper main support tube 246 may inflate independent from lower main support tube 248. Upper main support tube 246 may wrap around lower main support tube 248 at toe end 108 and may extend along first side 116 and second side 118. In this regard, upper main support tube 246 may comprise an end transverse portion 243 extending crosswise between first side 116 and second side 118 of evacuation slide 100. Lower main support tube 248 may extend along first side 116 and second side 118. First sill height compensating feature 120 and second sill height compensating feature 130 may be inflatable. First sill height compensating feature 120 and second sill height compensating feature 130 may be in fluid communication with upper chamber 242.

In various embodiments, upper main support tube 246 and lower main support tube 248 may be attached to a first lateral edge 124 of flexible panel 110 and a second lateral edge 126 of flexible panel 110. Flexible panel 110 may be supported between upper main support tube 246 and lower main support tube 248.

With reference to FIG. 2A, evacuation slide 100 is illustrated in a deployed position at a sill height 202 without a load. Sill height 202 may be the sill height of evacuation slide 100 deployed from an aircraft on a level surface with all landing gear properly deployed. Sill height 202 may be referred to in the art as a "normal" sill height.

In various embodiments, first sill height compensating feature 120 and second sill height compensating feature 130 may support toe end 108 when evacuation slide 100 is not supporting an evacuee. Stated differently, toe end 108 may be lifted off exit surface 170 in response to evacuation slide 100 being in the deployed position and without supporting a load, such as an evacuee for example.

Figure 2B:
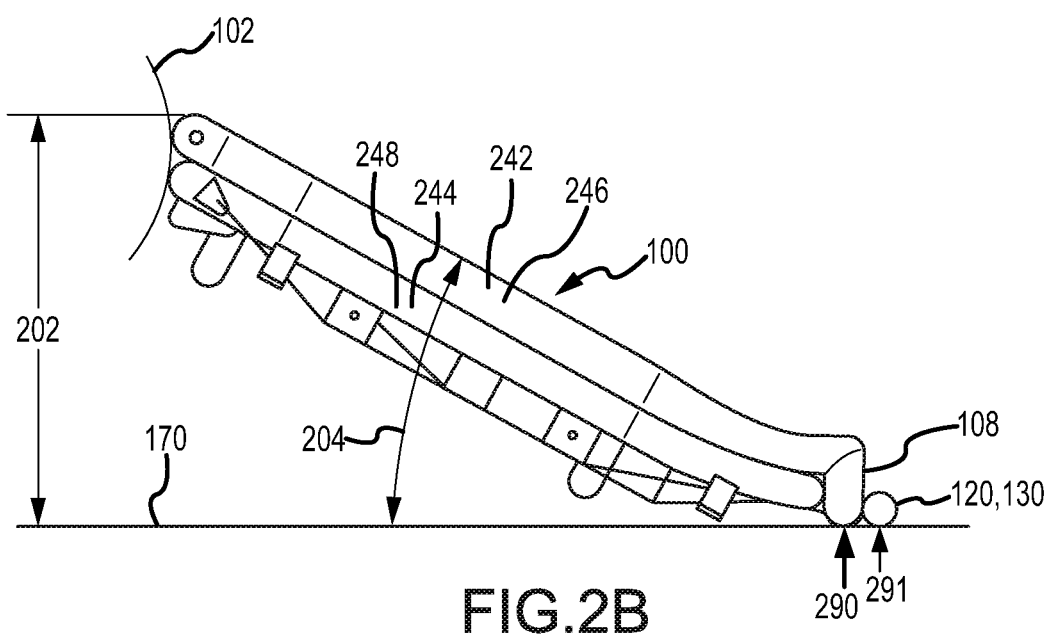
FIG. 2B illustrates a side view of the inflated evacuation slide of FIG. 2A at the normal sill height and supporting a load, in accordance with various embodiments.

With respect to FIG. 2B, elements with like element numbering, as depicted in FIG. 2A, are intended to be the same and will not necessarily be repeated for the sake of clarity.

With reference to FIG. 2B, evacuation slide 100 is illustrated in a deployed position at a sill height 202 with a load. Evacuation slide 100 supporting one or more persons during an evacuation event. In various embodiments, first sill height compensating feature 120 and second sill height compensating feature 130 may partially disengage from supporting toe end 108 when evacuation slide 100 is supporting an evacuee. Stated differently, the load force between the evacuee (or evacuees) may be mainly transmitted from the evacuees(s) to the exit surface 170 through toe end 108 with only a portion of the load being transmitted through first sill height compensating feature 120 and second sill height compensating feature 130. In this regard, a force 290 may be transmitted between toe end 108 and exit surface 170 and a force 291 may be transmitted between first sill height compensating feature 120 and second sill height compensating feature 130 and exit surface 170. Force 290 may be greater than force 291. In this regard, first sill height compensating feature 120 and second sill height compensating feature 130 may be held under slight spring tension in response to a load being supported by evacuation slide 100. As the load is removed from the evacuation slide (e.g., an evacuee exiting at toe end 108), first sill height compensating feature 120 and second sill height compensating feature 130 may raise toe end 108 from exit surface 170, which may assist an evacuee in exiting toe end 108. For example, evacuation slide 100 may move from the loaded position as illustrated in FIG. 2B to the unloaded position as shown in FIG. 2A in response to a load being removed (e.g., an evacuee exiting evacuation slide 100) from evacuation slide 100.

Figure 3:
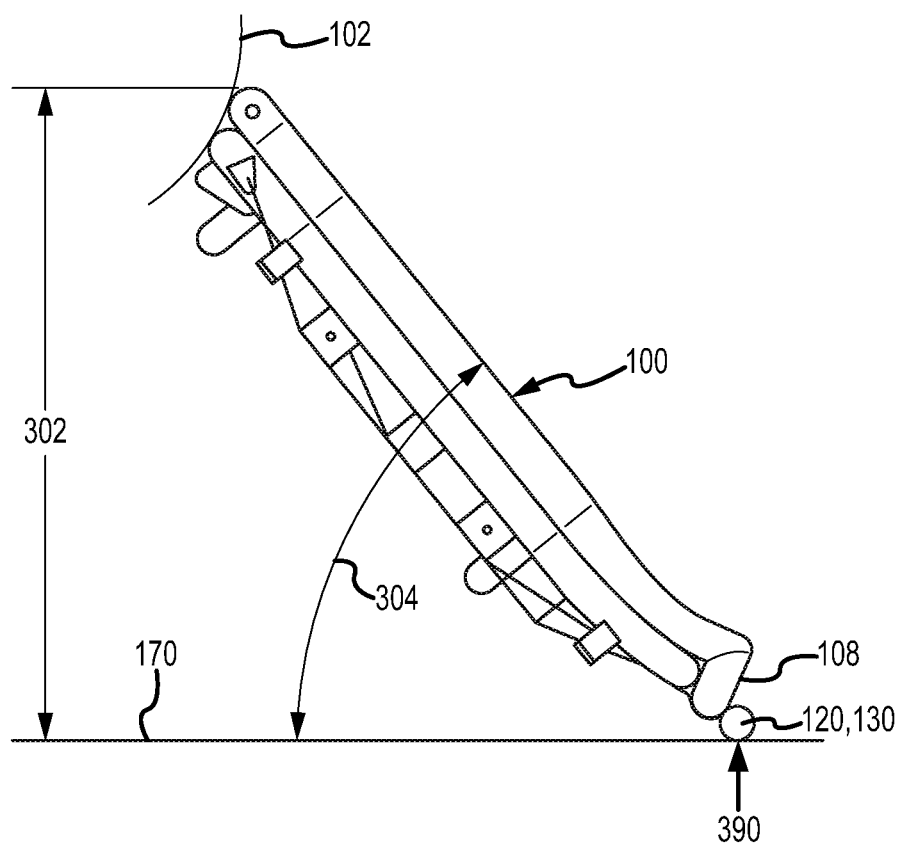
FIG. 3 illustrates a side view of the inflated evacuation slide of FIG. 2A at a high sill height, in accordance with various embodiments.

With reference to FIG. 3, evacuation slide 100 is illustrated in a deployed position at a sill height 302. Sill height 302 may be greater than sill height 202 of FIG. 2A. For example, evacuation slide 100 may comprise a sill height 302 in response to an aircraft being supported by a non-level surface, or an aircraft having a landing gear which is not deployed, or improperly deployed, for example. FIG. 3 may represent evacuation slide 100 with or without a load. Although illustrated as contacting exit surface 170, it is contemplated that first sill height compensating feature 120 and second sill height compensating feature 130 may float above exit surface 170 when evacuation slide 100 is in the deployed position at sill height 302 and without a load. Sill height 302 may be referred to in the art as a "high" sill height.

In various embodiments, toe end 108 of evacuation slide 100 may be supported solely by first sill height compensating feature 120 and second sill height compensating feature 130 in response to evacuation slide 100 supporting a load. In this regard, all of the load force 390 between the evacuee (or evacuees) and exit surface 170 is transmitted through first sill height compensating feature 120 and second sill height compensating feature 130.

In various embodiments, first sill height compensating feature 120 and second sill height compensating feature 130 may reduce the angle 304 of evacuation slide 100 with respect to exit surface 170 at sill height 302. For example, without first sill height compensating feature 120 and second sill height compensating feature 130, evacuation slide 100 would be oriented at a greater (i.e., steeper) angle with respect to exit surface 170. Lifting toe end 108 from exit surface 170, via first sill height compensating feature 120 and second sill height compensating feature 130, reduces this angle which may allow for evacuees to exit evacuation slide 100 at a desirable speed and/or angle. In this regard, first sill height compensating feature 120 and second sill height compensating feature 130 reduce angle 304 at sill height 302 while minimally impacting angle 204 at sill height 202, with momentary reference to FIG. 2B.

Figure 4A:
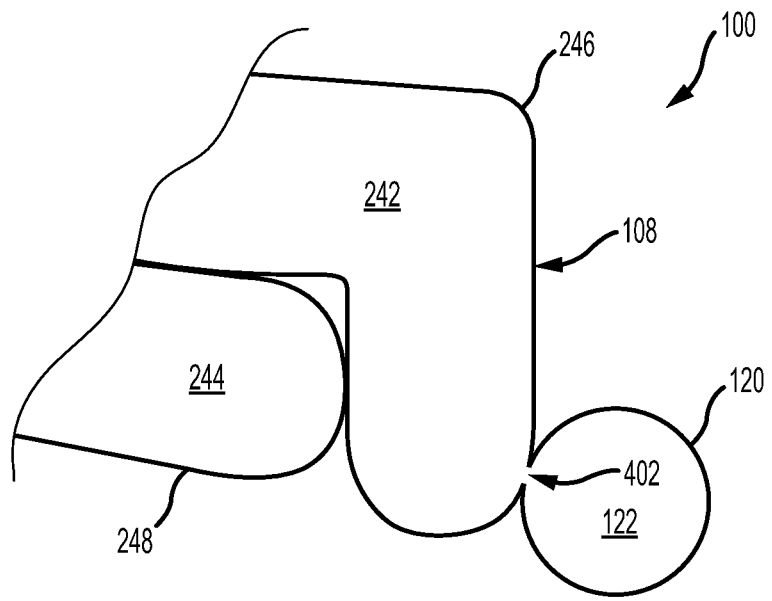
FIG. 4A illustrates a sectional view of a toe end of the evacuation slide of FIG. 2A, in accordance with various embodiments.

With reference to FIG. 4A, a cross-section view of evacuation slide 100 is illustrated, in accordance with various embodiments. First sill height compensating feature 120 may be coupled to upper main support tube 246. First sill height compensating feature 120 may be in fluid communication with upper chamber 242. An aperture 402 may be disposed between upper chamber 242 and chamber 122 of first sill height compensating feature 120. Aperture 402 may meter the flow of air from upper chamber 242 to first sill height compensating feature 120. In this regard, aperture 402 may be configured to allow upper chamber 242 to fully inflate before first sill height compensating feature 120 becomes fully inflated so as to tend to minimize the impact on the inflation time of upper chamber 242. In this regard, the cross-sectional area (measured orthogonal to the flow of air entering first sill height compensating feature 120) may be less than half of the cross-sectional area of upper chamber 242, and in various embodiments, may be less than one fourth of the cross-sectional area of upper chamber 242, and in various embodiments, may be less than one eighth of the cross-sectional area of upper chamber 242. In various embodiments, first sill height compensating feature 120 may be bonded to upper main support tube 246. First sill height compensating feature 120 may be bonded to upper main support tube 246 with an adhesive, for example. In various embodiments, first sill height compensating feature 120 may be sewn to upper main support tube 246. Second sill height compensating feature 130 may be coupled to upper main support tube 246 in a similar manner as first sill height compensating feature 120.

Figure 4B:
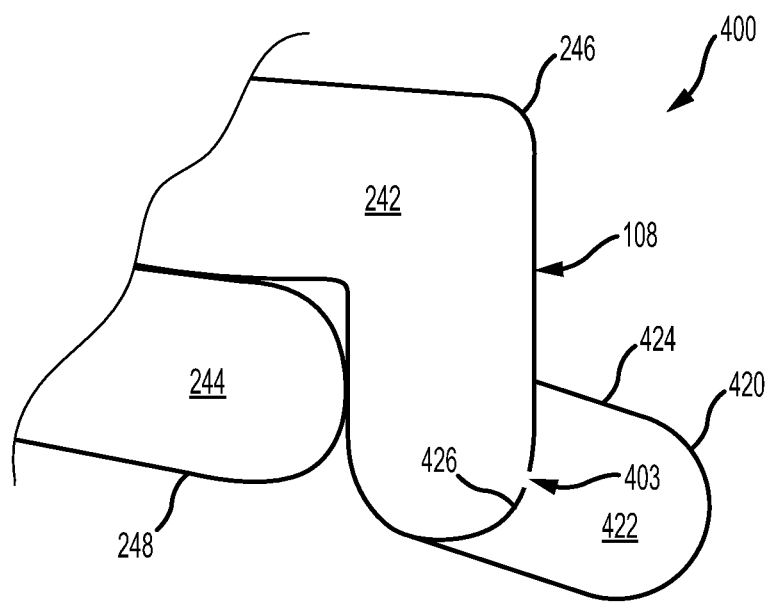
FIG. 4B illustrates a sectional view of a toe end of an evacuation slide having a sill height compensating feature comprising an extension of an upper main support tube, in accordance with various embodiments.

With reference to FIG. 4B, a cross-section view of an evacuation slide 400 having a sill height compensating feature 420 is illustrated, in accordance with various embodiments. In various embodiments, first sill height compensating feature 120 and/or second sill height compensating feature 130 may be similar to sill height compensating feature 420, with momentary reference to FIG. 1A. Sill height compensating feature 420 may comprise an extension 424 of upper main support tube 246. Extension 424 may extend away from toe end 108. A bulkhead 426 may be disposed between upper chamber 242 and chamber 422 of sill height compensating feature 420. Bulkhead 426 may comprise a sheet of material. In various embodiments, bulkhead 426 may be comprised of upper main support tube 246. Stated differently, upper main support tube may define bulkhead 426. Sill height compensating feature 420 may be coupled to upper main support tube 246. Sill height compensating feature 420 may be in fluid communication with upper chamber 242. An aperture 402 may be disposed between upper chamber 242 and chamber 122 of first sill height compensating feature 120. Aperture 402 may be disposed in bulkhead 426. Aperture 402 may meter the flow of air from upper chamber 242 to first sill height compensating feature 120. In this regard, aperture 403 may be configured to allow upper chamber 242 to fully inflate before sill height compensating feature 420 becomes fully inflated so as to minimally impact the inflation time of upper chamber 242. In this regard, the cross-sectional area (measured orthogonal to the flow of air entering sill height compensating feature 420) may be less than half of the cross-sectional area of upper chamber 242, and in various embodiments, may be less than one fourth of the cross-sectional area of upper chamber 242, and in various embodiments, may be less than one eighth of the cross-sectional area of upper chamber 242. In various embodiments, sill height compensating feature 420 may be bonded to upper main support tube 246. Sill height compensating feature 120 may be bonded to upper main support tube 246 with an adhesive, for example. In various embodiments, sill height compensating feature 420 may be sewn to upper main support tube 246.

Figure 5:
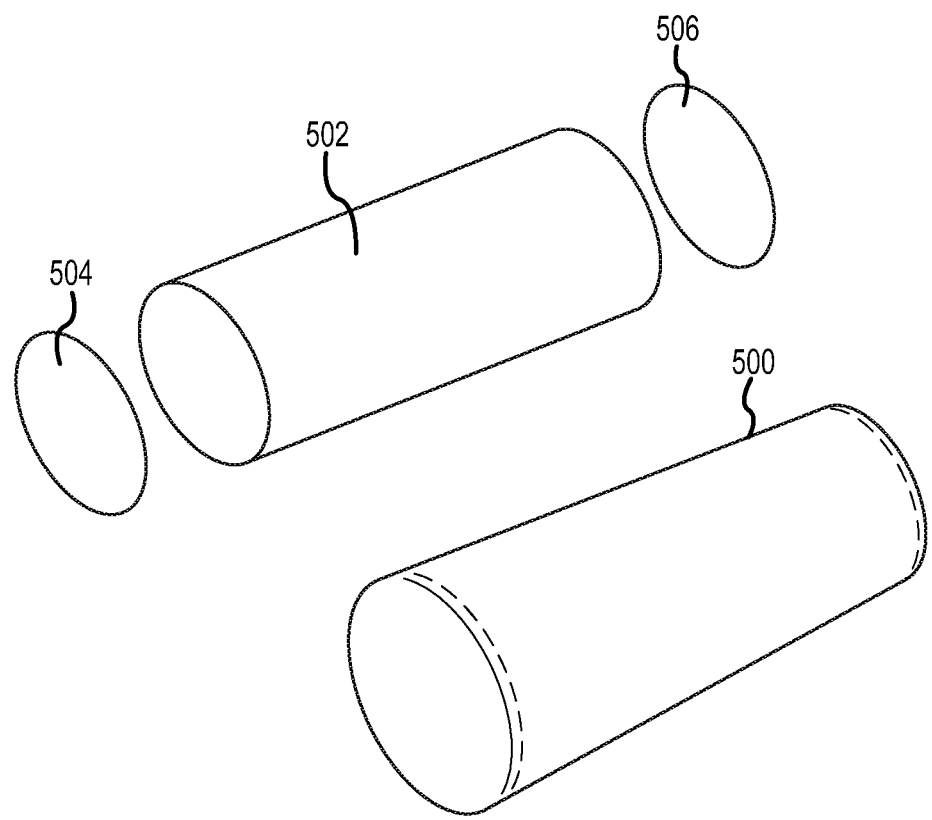
FIG. 5 illustrates a sill height compensating feature, in accordance with various embodiments.

With reference to FIG. 5, a sill height compensating feature 500 is illustrated, in accordance with various embodiments. In various embodiments, first sill height compensating feature 120 and/or second sill height compensating feature 130 may be similar to sill height compensating feature 500, with momentary reference to FIG. 1A. Sill height compensating feature 500 may be made from a sidewall sheet 502, a first endcap sheet 504, and a second endcap sheet 506. Sidewall sheet 502 may be sewn and/or bonded to first endcap sheet 504 and a second endcap sheet 506 to form sill height compensating feature 500. Sill height compensating feature 500 may comprise a cylindrical geometry.

Figure 6:
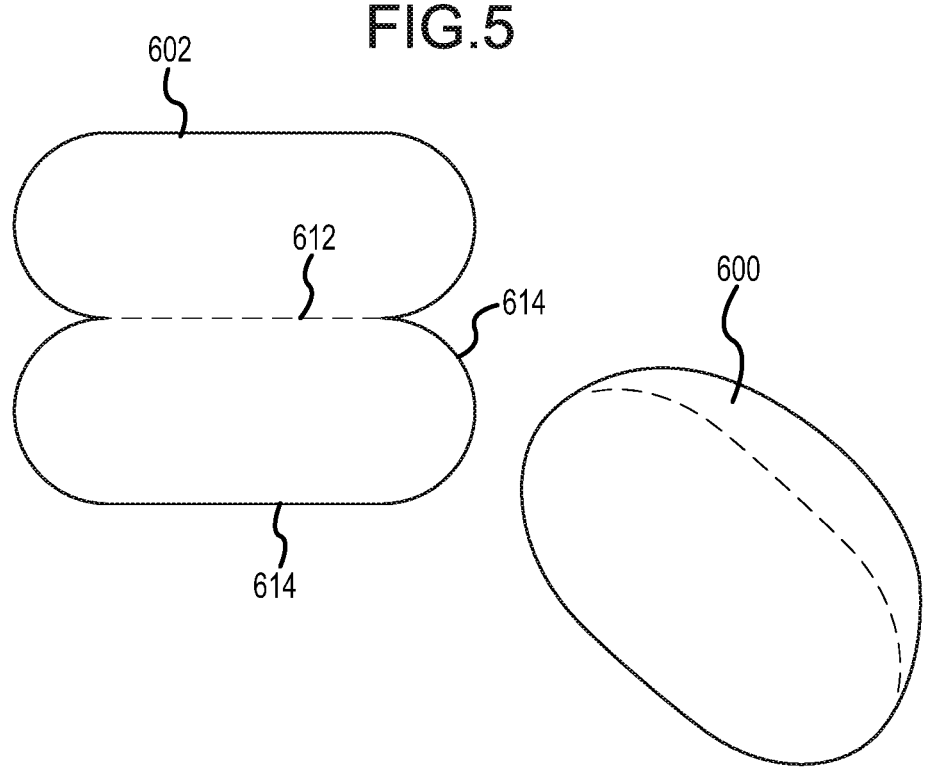
FIG. 6 illustrates a sill height compensating feature, in accordance with various embodiments.

With reference to FIG. 6, a sill height compensating feature 600 is illustrated, in accordance with various embodiments. In various embodiments, first sill height compensating feature 120 and/or second sill height compensating feature 130 may be similar to sill height compensating feature 600, with momentary reference to FIG. 1A. Sill height compensating feature 600 may be made from a single sheet folded about fold-line 612 and sewn and/or bonded along edge 614 to form sill height compensating feature 600. Sill height compensating feature 500 may comprise an ellipsoidal geometry.

Figure 7:
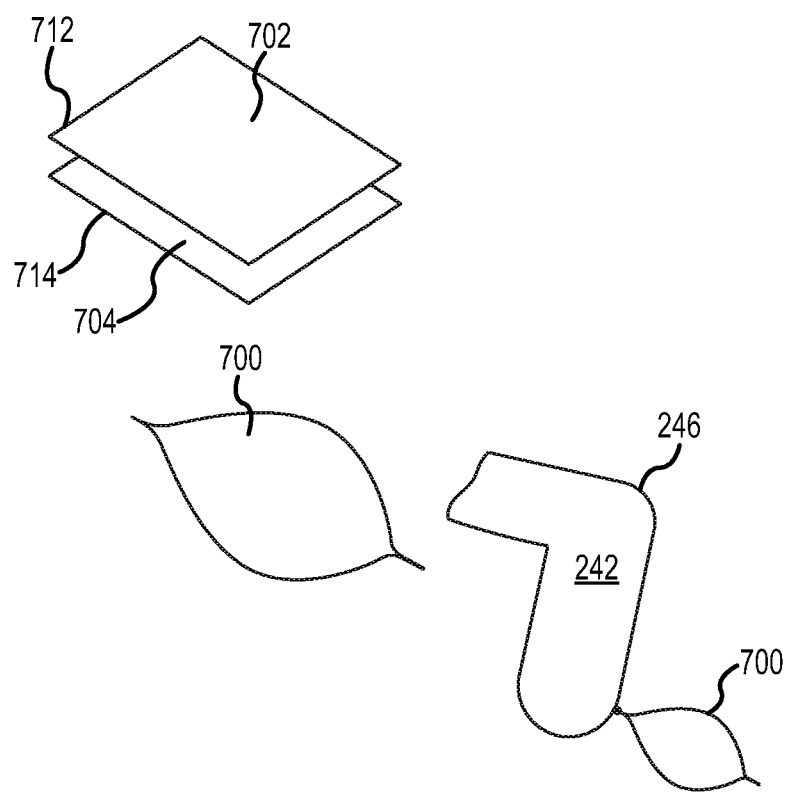
FIG. 7 illustrates a sill height compensating feature, in accordance with various embodiments.

With reference to FIG. 7, a sill height compensating feature 700 is illustrated, in accordance with various embodiments. In various embodiments, first sill height compensating feature 120 and/or second sill height compensating feature 130 may be similar to sill height compensating feature 700, with momentary reference to FIG. 1A. Sill height compensating feature 700 may be made from a first sidewall sheet 702 and a second sidewall sheet 704. First sidewall sheet 702 may be sewn and/or bonded to second sidewall sheet 704 along edge 712 and edge 714, respectively, to form sill height compensating feature 700. Sill height compensating feature 700 may be coupled to upper main support tube 246 at its edge 712, 714.

Figure 8:
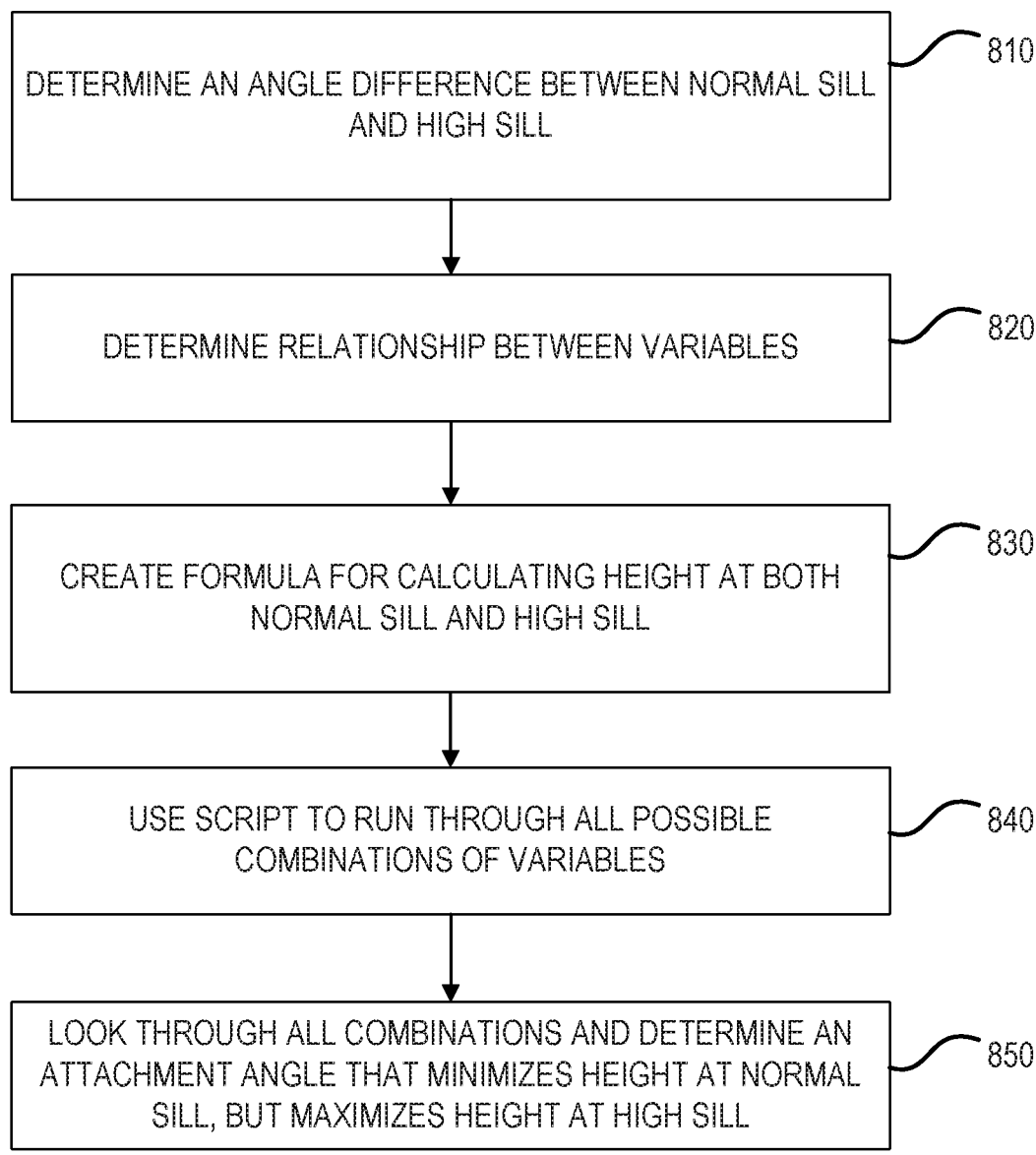
FIG. 8 illustrates a method for manufacturing an evacuation slide, in accordance with various embodiments.

With reference to FIG. 8, a method 800 for determining an attachment angle of a sill height compensating feature is illustrated, in accordance with various embodiments. Method 800 includes determining an angle difference between normal sill and high sill (step 810). Method 800 includes determining a relationship between variables (step 820). Method 800 includes creating a formula for calculating a height at both normal sill and high sill (step 830). Method 800 includes using a script to run through all possible combination of variables (step 840). Method 800 includes looking through all combinations and determining an attachment angle that minimizes height at normal sill, but maximizes height at high sill (step 850).

Figure 9A:
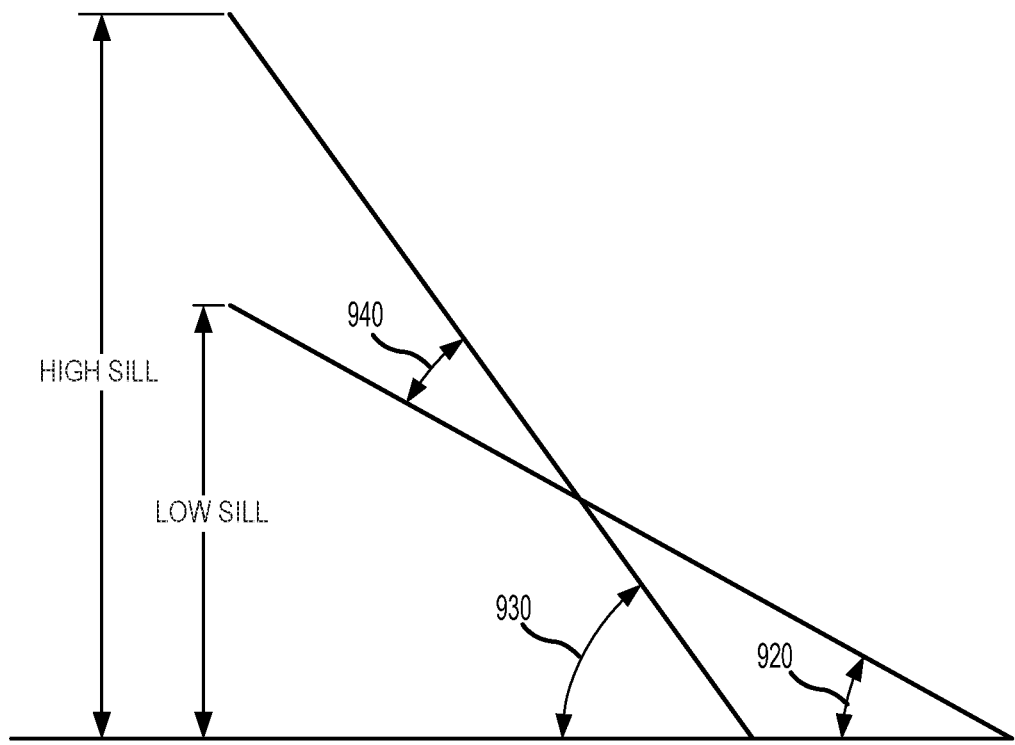
FIG. 9A illustrates different angles of an evacuation slide at high sill and low sill, and an angle difference therebetween, in accordance with various embodiments.

With combined reference to FIG. 8 and FIG. 9A, step 810 may include determining an angle difference 940 between normal sill and high sill. For example, an evacuation slide may be oriented at a normal sill angle 920 at normal sill and a high sill angle 930 at high sill. The difference between normal sill angle 920 and a high sill angle 930 may be angle difference 940.

Figure 9B:
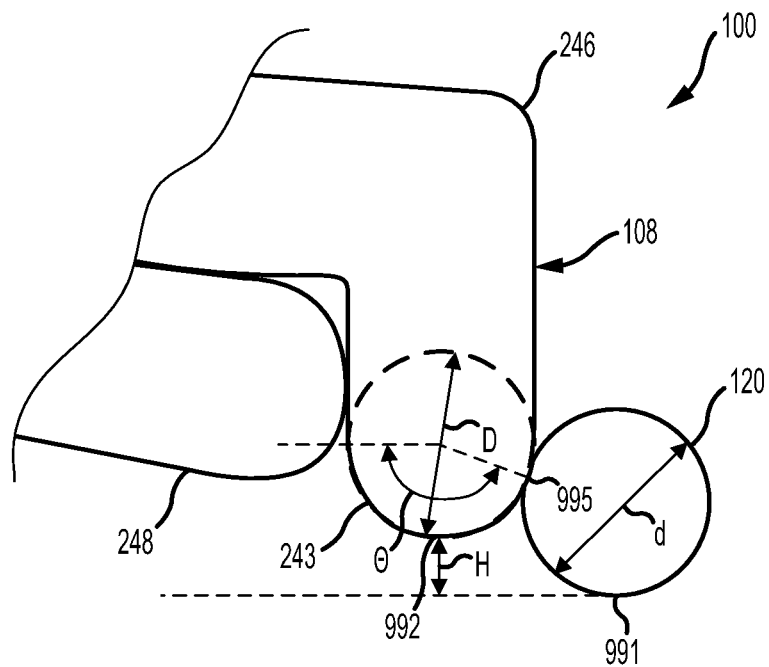
FIG. 9B illustrates various variables of an evacuation slide and associated sill height compensating feature, in accordance with various embodiments.

With combined reference to FIG. 8 and FIG. 9B, step 820 may include determining a relationship between upper tube diameter (D), lower tube diameter (d), attachment angle ($\Theta$), and height (H). Upper tube diameter (D) may be the diameter of upper main support tube 246 at end transverse portion 243. Lower tube diameter (d) may be the diameter of first sill height compensating feature 120. Attachment angle ($\Theta$) may correspond to the location that first sill height compensating feature 120 attaches to end transverse portion 243 of upper main support tube 246. In various embodiments, attachment angle ($\Theta$) may be the angle between the location 995 that first sill height compensating feature 120 is attached to end transverse portion 243 of upper main support tube 246 and the horizontal direction. However, attachment angle ($\Theta$) may be the angle between the location 995 that first sill height compensating feature 120 is attached to end transverse portion 243 of upper main support tube 246 and any reference direction. Height (H) may be the vertical distance between the bottom 991 of first sill height compensating feature 120 and the bottom 992 of end transverse portion 243 of upper main support tube 246.

Step 830 may include creating a formula for calculating height (H) at both normal sill and high sill.

Step 840 may include using a script to run through all possible combinations of the variables D, d, $\Theta$, and H.

Step 850 may include looking through all combinations to determine an attachment angle that minimizes height (H) at normal sill, but maximizes height (H) at high sill.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing an evacuation slide, comprising:
    disposing a lower main support tube to extend longitudinally along a first side of the evacuation slide and to extend longitudinally along a second side of the evacuation slide;
    disposing an upper main support tube to extend longitudinally along the first side of the evacuation slide and to extend longitudinally along the second side of the evacuation slide, wherein the upper main support tube at least partially defines a toe end of the evacuation slide and includes an end transverse tube connected to the toe end of the evacuation slide, and wherein the end transverse tube extends crosswise between the first side of the evacuation slide and the second side of the evacuation slide such that the upper main support tube at least partially wraps around the lower main support tube at the toe end of the evacuation slide in a longitudinal direction of the slide when in an inflated state;
    disposing a flexible panel defining a sliding surface extending longitudinally between the toe end of the evacuation slide and a head end of the evacuation slide and to extend crosswise between the first side of the evacuation slide and the second side of the evacuation slide, wherein the flexible panel is supported between the upper main support tube and the lower main support tube, and wherein the sliding surface terminates at the toe end of the evacuation slide;
    coupling a first sill height compensating feature to the end transverse tube at the toe end of the evacuation slide; and
    coupling a second sill height compensating feature to the end transverse tube at the toe end of the evacuation slide such that the second sill height compensating feature is laterally spaced apart from the first sill height compensating feature;
    wherein the first sill height compensating feature and the second sill height compensating feature extend longitudinally past the sliding surface of the evacuation slide and longitudinally past the toe end of the evacuation slide and longitudinally past the end transverse tube in response to the evacuation slide being deployed.

2. The method of claim 1, wherein the sliding surface is disposed between the first sill height compensating feature and the second sill height compensating feature.

3. The method of claim 1, wherein the step of coupling the first sill height compensating feature or the second sill height compensating feature includes at least one of sewing or bonding.

4. The method of claim 1, further comprising disposing an aperture between a chamber defined by the first sill height compensating feature and an upper chamber defined by the upper main support tube.

5. The method of claim 4, wherein the chamber is in fluid communication with the upper chamber via the aperture, and the aperture configured to meter a flow of air entering the first sill height compensating feature.

6. The method of claim 1, wherein the first sill height compensating feature and the second sill height compensating feature are coupled to the evacuation slide such that an evacuee can exit the evacuation slide at the toe end by passing between the first sill height compensating feature and the second sill height compensating feature.

\* \* \* \* \*